ELECTRIC FREQUENCY MODULATION SYSTEM OF COMMUNICATION
Filed June 22, 1950
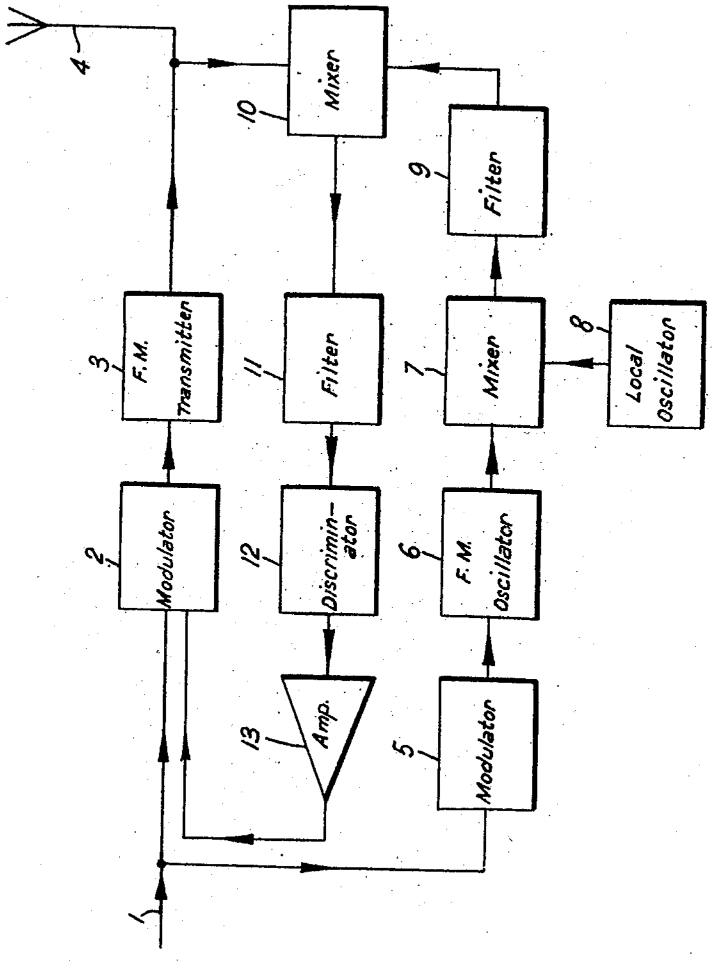
Inventor
THOMAS S. McLEOD
By [signature]
Attorney Patented Mar. 16, 1954 2,672,589

UNITED STATES PATENT OFFICE 2,672,589

ELECTRIC FREQUENCY MODULATION SYSTEM OF COMMUNICATION

Thomas Symington McLeod, London, England, assignor to International Standard Electric Corporation, New York, N. Y., a corporation of Delaware Application June 22, 1950, Serial No. 169,695

Claims priority, application Great Britain June 24, 1949

4 Claims. (Cl. 332—18)

The present invention relates to electric frequency modulation systems of communication, and its principal object is to improve the linearity of modulation of radio transmitters employing frequency modulation, and to reduce the noise introduced in the output amplifier.

In multichannel frequency modulation systems, it is essential to obtain a linear relation between the signal amplitude and the frequency deviation over a wide frequency band, in order to avoid serious interference between different channels, and considerable difficulty is experienced in meeting this requirement with many types of high power radio transmitters.

The present invention attacks the problem by applying the principles of negative feedback. According to the invention the radio transmitter is provided with an auxiliary modulating path in which a low power oscillator with linear frequency modulation characteristics is modulated by the signals which modulate the radio transmitter, and a portion of the output of the radio transmitter is combined with the output of the low power oscillator in a mixer. The difference frequencies at the output of the mixer will be frequency modulated by the distortion components introduced by the non-linear modulation characteristic of the transmitter, and these are fed back in negative phase, after demodulation in a discriminator, to the input of the transmitter, thus reducing the distortion according to known principles.

The invention will be described with reference to the figure of the accompanying drawing, which shows a block schematic circuit diagram of an embodiment of the invention.

The input signals, which may comprise a wide band of frequencies corresponding to a large number of different channels, are applied at 1 to a modulator 2 by means of which they are applied to frequency modulate an oscillator in the transmitter 3 according to conventional practice. The frequency modulated waves are radiated by an antenna 4.

According to the invention, an auxiliary modulation path is provided, including a second modulator 5 through which the signals are applied to modulate the frequency of a low power oscillator 6 which has a linear modulation characteristic, and which can be relied on not to introduce appreciable distortion. The oscillator may operate at a comparatively high frequency (for example 4,000 megacycles per second) and the mean frequency is stepped down to a convenient frequency (for example 60 megacycles per second) by means of a mixer 7 supplied from a local oscillator 8, operating at 4,060 megacycles per second, for example. The lower sideband is selected by the filter 9 and is supplied to a second mixer 10 to which is also applied a proportion of the frequency modulated output of the transmitter 3. The selected sideband (which will be frequency modulated by the distortion introduced by the non-linear characteristic of the transmitter) are selected by the filter 11 and are supplied to a frequency discriminator 12 which recovers the actual signal distortion components produced. These are applied to the input of the modulator 2 through an amplifier 13, in such manner as to reduce the frequency deviation corresponding to the distortion components thereby improving the linearity of the characteristics of the transmitter 3.

The two frequencies applied to the mixer 10 should produce a difference frequency (which will be frequency modulated by the distortion components) of convenient value for the discriminator 12.

The results achieved depend on the linearity of the characteristics of the low power oscillator 6, and the most favourable type of oscillator, and mean frequency, should therefore be selected. The use of the mixer 7 enables any convenient frequency to be used for the oscillator 6.

The discriminator 12 will be assumed to include all the necessary amplifying and limiting arrangements. It should be noted however, that this discriminator need not have particularly linear characteristics since it deals only with distortion components, so that any non-linearity will be a second order effect. For the same reason only comparatively rough limiting is necessary. Furthermore, the filter 11 may have a relatively narrow pass band, thus a large degree of feedback may be used.

If the oscillator 6 can conveniently have a mean frequency near to that of the transmitter 3, while still having good linear modulation characteristics, the output may be connected directly to the mixer 10, the elements 7, 8 and 9 being omitted.

While the principles of the invention have been described above in connection wth specific embodiments and particular modifications thereof it is to be clearly understood that this description is made only by way of example and not as a limitation on the scope of the invention.

What is claimed is:

1. A frequency modulator for an electric communication system, comprising a main frequency modulation path having non-linear modulation characteristics, an auxiliary modulation path having linear modulation characteristics, means for applying the same input signals to the two paths, means for mixing the modulated waves from the outputs of the two paths, means for deriving from the mixing means a difference frequency which is frequency modulated by the distortion components produced by the non-linear characteristics of the main path, means for applying the modulated difference frequency to a discriminator in order to obtain the distortion components, and means for applying the distortion components to the input of the main path in such phase as to reduce the frequency deviation corresponding to the distortion components.

2. A frequency modulator according to claim 1 further including an oscillator arranged in the auxiliary path, means for applying the input signals to modulate the frequency of the said oscillator, a frequency changer, and means for applying the output of the said oscillator to the said frequency changer before application to the mixing means.

3. In a device of the character described, the combination with a non-linear frequency modulated transmitter circuit, and means for employing an audio input signal for modulation of said circuit; of means for employing the distortion components from the output of said transmitter circuit in a manner to reduce frequency deviation caused thereby, said last mentioned means comprising an auxiliary circuit adapted to receive said audio input signal for linear modulation thereof, means for filtering the modulated output of said auxiliary circuit for removal of one of the side bands thereof, means for mixing the output of said non-linear transmitter circuit with the filtered output of said linear modulation means to obtain a difference frequency proportional to the distortion components in the output of said non-linear transmitter circuit, and means for employing said difference frequency as a negative feed-back to the input of said non-linear transmitter circuit for reduction of frequency deviations normally introduced by said distortion components.

4. A multi-channel frequency modulation system having in combination a carrier initiating circuit and means for non-linear frequency modulating of said circuit by an audio input signal, an auxiliary modulating network including carrier initiating means adapted to be frequency modulated in a linear manner by said audio signal and including a high frequency oscillator, means for frequency modulating said high frequency oscillator with said audio input signal, means for beating the frequency modulated output of said oscillator with a high frequency signal of slightly different frequency to obtain a low frequency difference signal, and means for eliminating one of the side bands of said low frequency difference signal, means for mixing the filtered output of said auxiliary modulating network with the output of said non-linear frequency modulated transmitter circuit to obtain a difference frequency, means for modulating said difference frequency by the distortion components in the output of said non-linear circuit and means for the negative feed-back of said distortion component-modulated difference-signal to the input of said non-linear circuit for the reduction of frequency variation therein.

THOMAS SYMINGTON McLEOD.

References Cited in the file of this patent

UNITED STATES PATENTS

| Number | Name | Date |
|---|---|---|
| 2,279,660 | Crosby | Apr. 14, 1942 |
| 2,394,393 | Mayer | Feb. 5, 1946 |
| 2,501,355 | Pratt | Mar. 21, 1950 |
| 2,591,257 | Hershberger | Apr. 1, 1952 |